United States Patent [19]

Bortolin et al.

[11] Patent Number: 4,790,464
[45] Date of Patent: Dec. 13, 1988

[54] METHOD AND APPARATUS FOR CUTTING OPTICAL FIBRES

[75] Inventors: Bruno Bortolin, Cinisello Balsamo; Enrico Dotti, Milan, both of Italy

[73] Assignee: Societa' Cavi Pirelli S.p.A., Milan, Italy

[21] Appl. No.: 11,048

[22] Filed: Feb. 5, 1987

[30] Foreign Application Priority Data

Feb. 6, 1986 [IT] Italy ................. 19322 A/86

[51] Int. Cl.$^4$ ............................................. C03B 37/16
[52] U.S. Cl. .......................................... 225/2; 225/96; 225/101; 83/18; 83/51; 83/880
[58] Field of Search ................. 225/2, 96, 101; 83/18, 83/879, 880, 885, 51, 883, 857

[56] References Cited

U.S. PATENT DOCUMENTS

| | | | |
|---|---|---|---|
| 2,529,210 | 11/1950 | Butler | 83/883 |
| 4,274,572 | 6/1981 | Dunn et al. | 225/96.5 |
| 4,413,763 | 11/1983 | Lukas | 225/2 |
| 4,471,895 | 9/1984 | Lisec, Jr. | 225/2 |
| 4,473,942 | 10/1984 | Ridgway | 225/2 X |
| 4,502,620 | 3/1985 | Leiby | 225/2 |
| 4,591,082 | 5/1986 | Hodge | 225/2 |
| 4,621,754 | 11/1986 | Long et al. | 225/2 |
| 4,667,862 | 5/1987 | Millar et al. | 225/2 |

Primary Examiner—Frank T. Yost
Assistant Examiner—Eugenia A. Jones
Attorney, Agent, or Firm—Brooks Haidt Haffner & Delahunty

[57] ABSTRACT

Method and apparatus for cutting optical fibres, whereby said optical fibres provided with at least one protective covering, are caused to be cut by the transveral movement of two blades rigidly connected to one another and forming an angle of less than 45° between them.

7 Claims, 2 Drawing Sheets

METHOD AND APPARATUS FOR CUTTING OPTICAL FIBRES

In a known apparatus for cutting optical fibres, the blade is gradually (thanks to shock-absorbers) brought into contact with a fibre that is under traction and leans on a laterally flat support. Afterwards, a progressively increasing pressure is applied to the blade. This causes the drawbacks of a cut involving high percentages of waste, and the rapid damaging of the blade itself. As a matter of fact, the cut surfaces of the optical fibres frequently result as being uneven—with indicating that the separation results from tears; or otherwise, said cut surfaces do not result as being perpendicular to the fibre axis, since the cut takes place along a plane which is not perpendicular to the fibre, with this fact rendering the alignment, for the successive joining, to be extremely difficult.

According to another cutting modality, a blade is positioned against a fibre, curved upon a cylindrical surface that acts as a fibre support—and hence, it is caused to move perpendicularly to the fibre axis by taking advantage, through this way of cutting, of the flexional stresses to which the fibre is subjected.

This cutting method does not offer any substantial improvement as with respect to the already mentioned rectilineal cutting method. In both these cases, the fibre to be cut is denuded of all its protective coverings which otherwise, would render it even more difficult to carry out a correct cut.

Moreover, in spite of utilizing shock-absorbers, a certain "impact" is inevitable between the blade and the fibre, which could cause a relatively rapid wearing-out of the blade—and, if the cutting-edge of the blade is not in an excellent condition, the quality of the cut results as being compromised right from the start.

On the contrary, our invention allows for effectuating the cutting of the fibre, without having to remove or take away all the coverings and, in particular, with leaving at least one covering in place. This covering can be, for example, the first covering—formed by an acrylate applied in a single application, or else, obtained through the means of two or more successive applications of the same material. Moreover, the cutting of the straight-held fibre, takes place with a constant motion of translation and with a sliding of the blade on the optical fibre.

The invention consists of a method for cutting an optical fibre that is provided with at least one protective covering, characterized by the fact of comprising the following steps:

maintaining the portion of fibre to be cut, rectilineal and subjected to a constant traction;

applying a cutting action on the surface of the fibre, in correspondence of two points lying on a plane perpendicular to the axis of the fibre and circumferentially separated by an arc lying above an angle at the centre comprised between 135° and 180°, with simultaneously impeding any lateral shifting of the fibre.

Moreover, the invention consists of an apparatus for cutting an optical fibre, provided with at least one protective covering, of which one portion of the fibre is kept rectilineal and also subjected to a constant traction, characterized by the fact of having cutting means—formed by a pair of blades rigidly connected to one another, forming an angle of less than 45° between them, and transversally mobile with respect to the fibre, the said means cooperating with a curved supporting surface for the fibre.

The angle formed between the two blades, that are rigidly connected to one another, is less than 45°—and preferably, it is comprised between 2° and 10°. The complex formed by the blade is assembled, through articulated joints, to a support that is transversally mobile with respect to the fibre and, in this way, the blades result as being auto-centering with respect to the fibre.

The invention will now be described with reference to a preferred, but non-limiting form of realization, illustrated in the attached drawings—whereby:

Figure 1:
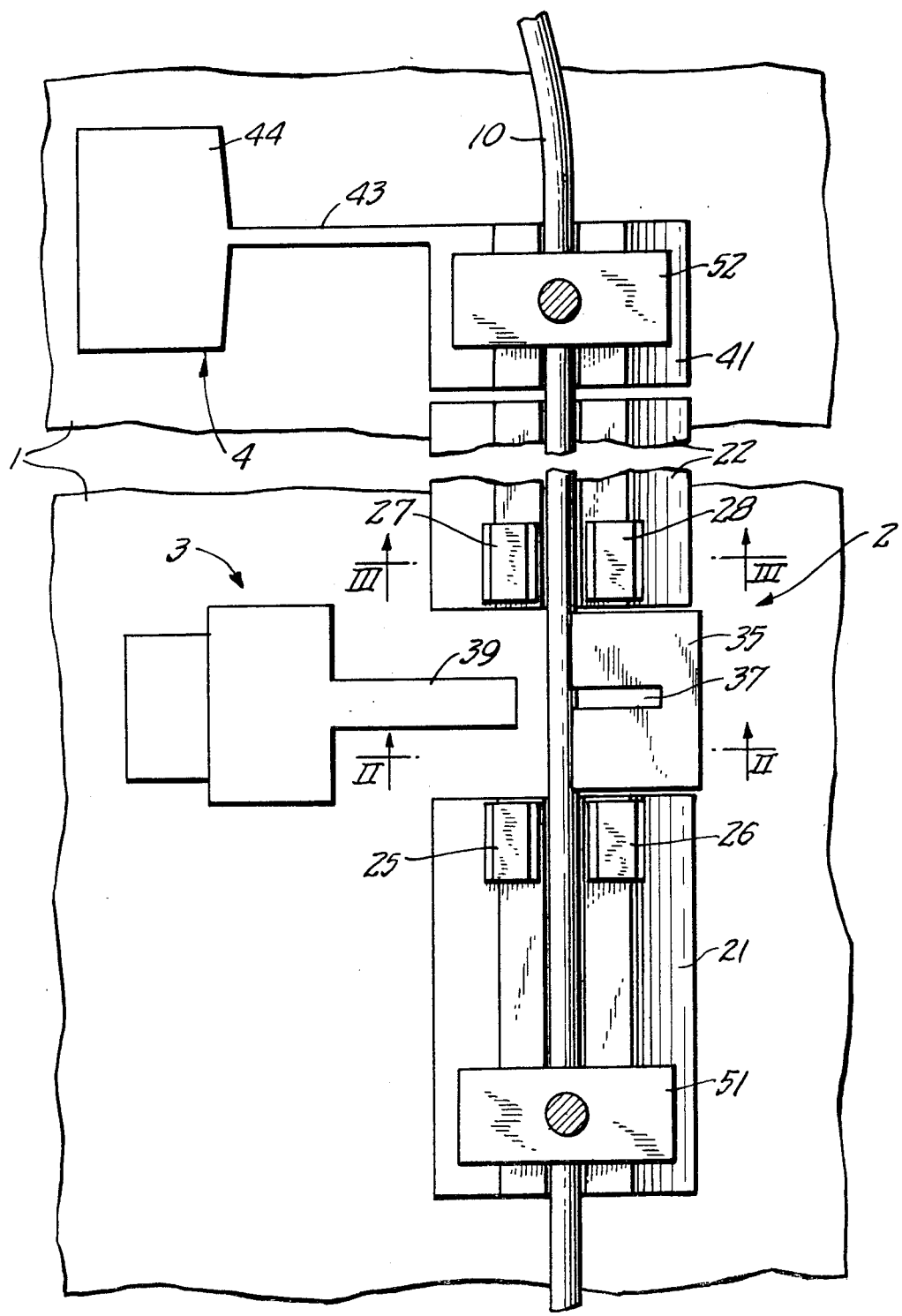
FIG. 1 is a partial, top-view of the cutting apparatus, according to the invention.

With reference to the figures, the cutting apparatus comprises a base slab 1 upon which there are mounted the means 2—for supporting the fibre 10, means 4—for maintaining the fibre taut, and means 3—for cutting.

The optical fibre 10 is supported and maintained in a rectilineal position, in the V-shaped supporting blocks 21 and 22, aligned and separated by an intermediate space within which cutting means 3 (to be described in more detail further on in the test) are disposed.

In correspondence of the extremities of the blocks 21, 22, facing the cutting means 3, there are foreseen guide elements 25-26 and 27-28, for the fibre. This latter is held adherent to the supports 21 and 22 by pressure 52 (such as those shown schematically in FIG. 1, with the reference numeral 51) that are formed by small blocks borne by tip-up arms (not shown) which press down on the fibre with a force determined by their weight, and-/or by the eventual presence of elastic elements.

Figure 3:
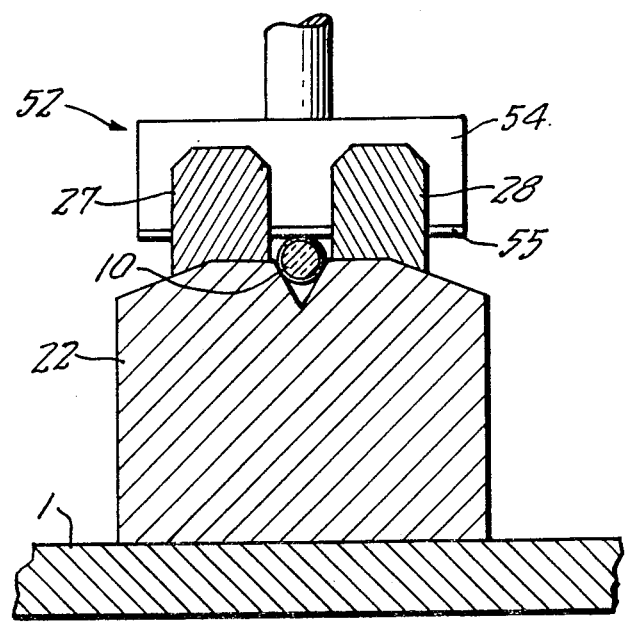
FIG. 3 is a partial section, according to the lines III—III of FIG. 1.

The fibre is subjected to a constant traction—thanks to a mobile support 41 (also having a V-section) and by a presser 52 (seen more clearly in FIG. 3), and comprising a small block 54, of material, for example: nylon, and a layer 55 of soft material, for example: rubber, contacting the fibre.

The mobile support 41 is connected to a dynamometrical device 44 thanks to an arm 43—and, in this way, the fibre 10—engaged between the mobile supports 41 and the pressor 52, can be subjected to the desired traction.

Figure 2:
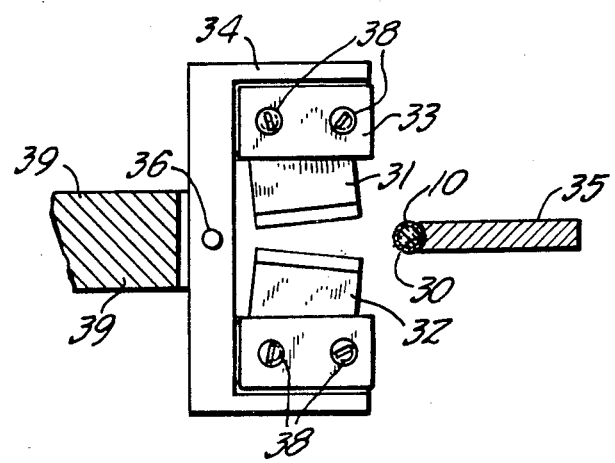
FIG. 2 is a cross-section—according to the lines II—II of FIG. 1.

The cutting means 3 (illustrated in more detail in FIG. 2) comprise two coplanar blades 31, 32, that are mounted on a C-shaped support 34 by means of plates and screws 38, that allow for the mounting according to diverse angles. In particular, the blades are mounted on the support 34 in such a way that their cutting edges form an angle of not greater than 45°, and preferably comprised between 2° and 10°.

The rigid complex—formed by the blades 31 and 32 and by support 34, is connected by an articulated joint (shown in the figure with a pin 36) to the arm 39 that determines the transversal movement of support 34, thanks to actioning means capable of causing the blades' support to advance with a constant speed, and which comprise the necessary shock-absorbers. (For the sake of simplicity, these means are not shown).

The transversal mobility of the optical fibre 10 under traction between the elements 25-26 and 27-28, is delimited by the concave surface 30 of a supporting slab 35 that extends between the pairs of said elements. Said slab has a corner which constitues a supporting surface and that is apt for engaging the fibre with preventing its shifting during the advancement of the blades. As can be seen in FIG. 1, the slab moreover, presents a transversal slot 37 for housing the blades in the last tract of the cutting operation, and for thus protecting them from impacts against the slab 35.

The thickness of the supporting slab 35, is preferably almost equal to the diameter of the optical fibre 10 (including the coverings still remaining on it).

The cutting operation takes place in the following manner.

After all the pressors are raised up, the optical fibre 10 is positioned on the V-shaped supports 21, 22 and 41, with introducing it between the elements 25–28. The supporting slab 35 can be shifted lateraly for facilitating the operation.

The pressers are thereupon lowered, for engaging the fibre and then the necessary traction is applied—thanks to the dynamometrical device 44.

At this point, the support 34 bearing the blades are caused to advance with a constant speed towards the fibre—and the blades slide over the fibre with cutting through the coverings thanks to the cooperation with the curved supporting surface 35 and with cutting into the fibre for, in this way, facilitating the complete separation caused by the traction—to which is subjected. The articulated joint formed by the pin 36, or by some other equivalent structure, allows for a mobility in a plane perpendicular to the axis of the fibre, of the complex formed by the blades, for thus compensating automatically, eventual small off centerings.

The blades are hence, moved back into their starting position.

From what has been described above, it results as being clear that the cutting of the fibre takes place thanks to a sliding of the blades upon the surface of the fibre itself and not through any movement of "impact-"—with thus improving the quality of the cut and with simultaneously reducing the wearing out of the blades.

Moreover, applying a cutting action, in correspondence of two points of the fibre, that lie on a plane perpendicular to the fibre's axis, and which are spaced apart from each other by an arc of a circle—equal to at least one-quarter the circumference of the optical fibre, defines the cutting plane, in an univocal manner, so that the cutting surface results as being even and perpendicular to the axis of the optical fibre.

It has been ascertained that the angle between the blades must not exceed 45°—i.e. this implies that the distance, measured circumferentially between two points wherein the cut is made, corresponds to an arc of a circumference having an angle comprised between 135° and 180°. This latter angle is in fact supplementary to the opening angle of the blades.

It is evident that a single blade, opportunely shaped, can substitute in an equivalent manner, the two blades 31, 32. Nevertheless, this type of solution is not the preferred one, because it does not consent for any adjustings of the angle formed by the blade—and moreover, it is of a more complex construction.

We hold that the high percentage of cuts—correctly obtained with the apparatus according to the invention, can be attributed to the combined action of "dynamic" cut and of the incision in two points, that are sufficiently spaced apart upon the fibre, that define with certainty the cutting plane. Moreover, the articulated connection allows for counter-balancing small shiftings in the reciprocal position in-between fibre and blade with rendering simpler and more reliable the utilizing of the cutting apparatus according to the invention.

Although the invention has been described with reference to a particular form of realization, it is not limited to this latter, but also extends to include all the obvious variations and/or modifications, both of construction as well as of use, that will result as being evident to the one skilled in the art. In particular, the apparatus can also be used for cutting the optical fibres devoid of all their coverings.

What is claimed is:

1. Method for cutting an optical fibre which is long relative to its cross-section and having a central unitary portion and which is provided with at least one protective covering, characterized by the fact of comprising the following steps:

maintaining the portion of fibre to be cut, rectilineal and subjected to a constant axial tension;

while maintaining the fibre under axial tension, simultaneously scoring said fibre in the direction transverse to its axis at two points lying on a plane perpendicular to the fibre axis and circumferentially separated by an arc contained within an angle, having its apex at the intersection of said plane with the axis of the fibre, in the range from 135° to 180° while simultaneously contacting and supporting said fibre on the side thereof opposite to the direction of scoring and preventing any lateral shifting and bending of said portion of the fibre being scored in a direction transverse to said axis.

2. Method as set forth in claim 1 wherein the scoring of said fibre is carried out by translating a pair of blades with cutting surfaces in spaced and stationary relation to each other in said plane perpendicular to said axis of said fibre.

3. Method as set forth in claim 2 wherein said fibre is subjected to axial tension before, during and after scoring of said fibre.

4. Apparatus for cutting an optical fiber comprising:

holding means for holding the portion of said fibre to be cut in a fixed position and extending along a rectilinear path;

tensioning means for engaging said fibre at opposite sides of said portion thereof and applying axial tension thereto with said fibre in said holding means;

blade mounting means disposed for movement transverse to the axis of said fibre at said portion thereof;

a pair of cutting blades mounted on said blade mounting means, said pair of cutting blades having elongated cutting surfaces disposed in spaced and stationary relation to each other and in a plane perpendicular to said axis of said fibre, said cutting surfaces at the ends thereof nearest said holding means having a spacing greater than the outer size of said fibre and having a spacing more remote from said holding means less than the outer size of said fiber; and said holding means comprising a support disposed at the side of the fibre to be cut opposite from said blade mounting means, said support having a concave surface engageable with the fibre adjacent to and at opposite sides of said plane.

5. Apparatus as set forth in claim 4 wherein said elongated cutting surfaces are rectilinear and are disposed at an angle to each other less than 45°.

6. Apparatus as set forth in claim 5 wherein said angle is in the range from 2° to 10°.

7. Apparatus as set forth in claim 4 wherein said blade mounting means has articulated means on which said cutting blades are mounted for permitting said cutting blades to move in fixed relation to each other in said plane.

* * * * *

UNITED STATES PATENT AND TRADEMARK OFFICE
CERTIFICATE OF CORRECTION

PATENT NO. : 4,790,464
DATED : December 13, 1988
INVENTOR(S) : Bortolin et al

It is certified that error appears in the above-identified patent and that said Letters Patent is hereby corrected as shown below:

Title page:

In the Abstract: lines 3 and 4, "transveral" should read --transversal--.

Column 1, after the title, please insert:

--The present invention concerns a method and an apparatus, for the cutting of optical fibres.

The precise cutting of optical fibres is rendered necessary for example for joining together two optical fibres, for executing the connection inbetween optical fibres through the means of connectors, for tests and measurements etc. In all these applications, the surfaces formed by the cut have to result as being perfectly smooth and perpendicular to the axes of the fibres themselves.

According to a known cutting technique, prior to the cutting, the fibre is denuded of its protective coverings, for preventing the blade from contacting those surfaces having a different cutting resistance - which could prejudice the evenness of the cut itself.

UNITED STATES PATENT AND TRADEMARK OFFICE
CERTIFICATE OF CORRECTION

PATENT NO. : 4,79 0,464
DATED     : December 13, 1988
INVENTOR(S) : Bortolin et al It is certified that error appears in the above-identified patent and that said Letters Patent is hereby corrected as shown below:

This involves a certain number of accessory operations upon the fibre and the risk of the formation of microcracks in correspondence of the nuded fibre-walls during welding operations (as a result of vibrations produced by the arc welding) apart from the possible absorption of humidity by the fibre portions that are no more protected. For these reasons, for example, the traction resistance of the joined fibres results as being much less when compared to that of the non-joined fibres.--

Signed and Sealed this

Sixteenth Day of May, 1989

*Attest:*

DONALD J. QUIGG

*Attesting Officer*  *Commissioner of Patents and Trademarks*